(12) United States Patent
Akasaka

(10) Patent No.: US 6,876,488 B1
(45) Date of Patent: Apr. 5, 2005

(54) DISCRETE AMPLIFICATION OF AN OPTICAL SIGNAL

(75) Inventor: Youichi Akasaka, Foster City, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 182 days.

(21) Appl. No.: 10/350,688

(22) Filed: Jan. 24, 2003

(51) Int. Cl.$^7$ ................................................ H01S 3/00
(52) U.S. Cl. ..................................... 359/334; 359/337.5
(58) Field of Search .............................. 359/334, 337.5, 359/337

(56) References Cited

PUBLICATIONS

Rottwitt, Karsten, Stentz, Andrew, Nielsen, Torben, Hansen, Per, Feder, Kenneth, and Walker, Kenneth, "Transparent 80 km Bi–Directionally Pumped Distributed Raman Amplifier with Second Order Pumping," ECOC'99, Oct. 26–30, 1999, Nice, France.

Dominic, Vince, Mathur, Atul, and Ziari, Mehrdad, "Second–order distributed Raman amplification with a high–power 1370 nm laser diode," OMC6–1, CAA 2001.

Primary Examiner—Mark Hellner

(57) ABSTRACT

A discrete optical amplifier system is disclosed comprising a Dispersion Compensating Fiber (DCF), a first order pump system, and a second order pump system. The first order pump system is set to a first power and is configured to backward pump onto the DCF. The second order pump system is set to a second power and is configured to forward pump onto the DCF. One or both of the first power and the second power are set based on a power ratio. The first and second pump systems generate a gain in an optical signal traveling on the DCF. The power ratio, the first power, and the second power are set to generate a low noise figure for the gain in the optical signal, and are set to distribute the gain along the DCF to reduce fiber non-linearities affecting the optical signal while traveling over the DCF.

21 Claims, 6 Drawing Sheets

| OPTICAL POWER (mW) | | | | | | | | |
|---|---|---|---|---|---|---|---|---|
| PUMP 522 | 225.4 | 231.6 | 245.3 | 259.0 | 276.4 | 291.4 | 303.6 | 315.2 |
| PUMP 524 | 1500 | 939.0 | 744.0 | 635.8 | 372.7 | 220.1 | 142.4 | 0.0 |

DISCRETE AMPLIFICATION OF AN OPTICAL SIGNAL

BACKGROUND OF THE INVENTION

1. Field of the Invention

This invention is related to the field of communication systems, and in particular, to systems and methods of providing discrete amplification of an optical signal.

2. Statement of the Problem

Many communication companies use fiber optic cabling as a media for transmitting data because of its high-bandwidth capacity. Fiber optic cables reliably transport optical signals over long distances. Over a distance, an optical signal attenuates in the fiber due to Rayleigh scattering. The attenuation may be recovered by an optical amplifier, however, the optical amplifier adds noise to the optical signal. The noise accumulation on the optical signal can especially be a problem for ultra long haul transmissions that have a high bit rate.

Optical amplifiers may be discrete amplifiers or distributed amplifiers. Distributed amplifiers use the transmission fiber, that is carrying the optical signal, as a gain medium. Discrete amplifiers do not use transmission fiber as a gain medium, but use another type of fiber or component as the gain medium.

One type of discrete amplifier is an Erbium-Doped Fiber Amplifier (EDFA). In an EDFA, an Erbium-doped fiber receives optical signals from a transmission fiber. A pump laser transmits a 980 nm laser beam onto Erbium-doped fiber concurrently as the optical signals travel over the Erbium-doped fiber. The properties of the Erbium-doped fiber act to absorb the laser beam and generate a gain in the optical signals using the absorbed laser beam. In this example, the Erbium-doped fiber acts as the gain medium, not the transmission fiber. Unfortunately, EDFA's have a limit on the gain bandwidth they can produce and cannot effectively be used for ultra wide band transmissions.

Another type of discrete optical amplifier is a Raman amplifier. In a discrete Raman amplifier, a fiber span within the Raman amplifier receives optical signals from a transmission fiber. The fiber span may be a highly doped fiber, such as a dispersion compensating fiber. A Raman pump laser backward pumps a laser beam onto the fiber span carrying the optical signals. Based on the "Raman Effect", the laser beam generates a gain in the optical signals traveling on the fiber span. For instance, a 1480 nm laser beam, transmitted over a fiber span carrying optical signals, generates a gain in the optical signals in the range of 1565–1600 nm. The discrete Raman amplifier provides a wider gain bandwidth and allows for replacement of high-powered EDFAs. However, the discrete Raman amplifier generates a higher noise figure than EDFAs.

Raman amplifiers can also be used for distributed amplification. Designers have improved the noise figure problems for distributed Raman amplification using a second order pump. One particular pumping scheme was described in a paper entitled "Transparent 80 km Bi-Directional Pumped Distributed Raman Amplifier with Second Order Pumping", which was authored by Karsten Rottwitt et. al. and published in ECOC '99, Sep. 26–30, 1999 (Rottwitt paper), which is incorporated herein by reference into this application. The Rottwitt paper describes a distributed optical amplifier using a second order pump in addition to a first order pump. The first order pump backward pumps a laser beam onto a transmission fiber and the second order pump forward pumps a laser beam onto the transmission fiber. The transmission fiber acts as the gain medium, thus describing distributed amplification. To improve the noise figure, the first order pump is set to a power of 200 mW at 1455 nm, while the second order pump is set to a power of 800 mW at 1366 nm. By adding the second order pump, the gain is generated earlier in the length of the transmission fiber resulting in an improved noise figure. This configuration is illustrated below in FIG. 1.

One problem with the distributed optical amplifier described in the Rottwitt paper is that it only describes distributed Raman amplification, and does not effectively describe a discrete optical amplifier. Discrete optical amplifiers may be preferred over distributed optical amplifiers for some applications or configurations. Another problem with the distributed optical amplifier described the Rottwitt paper is that only the noise figure is considered when setting the pump powers of the first order pump and the second order pump. The pump powers may affect other performance factors. For instance, as the power of the second order pump increases, the gain in the transmission fiber occurs earlier in the transmission fiber. The earlier the gain occurs, the higher the average signal power over the length of the transmission fiber. The higher the average signal power over the length of the transmission fiber, the higher the fiber non-linearities that may negatively affect the optical signal. Thus, the Rottwitt paper fails to consider other performance factors when setting the pump powers.

SUMMARY OF THE SOLUTION

One example of the invention helps solve the above problems with a discrete optical amplifier system having a Dispersion Compensating Fiber (DCF), a first order pump system, and a second order pump system. The first order pump system is set to a first power and is configured to backward pump onto the DCF. The second order pump system is set to a second power and is configured to forward pump onto the DCF. One or both of the first power and the second power are set based on a power ratio. The power ratio includes as variables the first power and the second power. Concurrently, the DCF receives an optical signal, possibly from a regular transmission fiber. As the optical signal travels over the DCF, the first order pump system and the second order pump system generate a gain in the optical signal.

For the discrete optical amplifier system to perform as desired, the power ratio, the first power of the first order pump system, and the second power of the second order pump system are set as follows. The power ratio, the first power, and the second power are set to generate a low noise figure for the gain in the optical signal. The power ratio, the first power, and the second power are also set to distribute the gain along the DCF to reduce fiber non-linearities affecting the optical signal while traveling over the DCF.

The discrete optical amplifier system advantageously takes into account fiber non-linearity and the noise figure when setting the power for the pump systems. The discrete optical amplifier system advantageously provides a 2 dB noise figure improvement over other systems. The discrete optical amplifier system also advantageously uses a length of DCF that is substantially shorter than a transmission fiber, which allows the first order pump system and the second order pump system to be much closer and maximizes pump-to-pump interaction.

Another example of the invention comprises a method of calibrating the discrete optical amplifier system described in the above example. The method comprises selecting a power ratio having as variables the first power of the first order pump system and the second power of the second order pump. The power ratio is selected to distribute the gain over a length of the DCF to reduce fiber non-linearities affecting the optical signal while traveling over the DCF. The method further comprises selecting the first power of the first order pump system that generates a low noise figure for the gain in the optical signal. The method further comprises selecting the second power of the second order pump system based on the power ratio and the first power of the first order pump system. The method may further comprise setting the first order pump system to the first power and setting the second order pump system to the second power.

The invention may include other examples described below.

DESCRIPTION OF THE DRAWINGS

The same reference number represents the same element on all drawings.

DETAILED DESCRIPTION OF THE INVENTION

Figure 1:
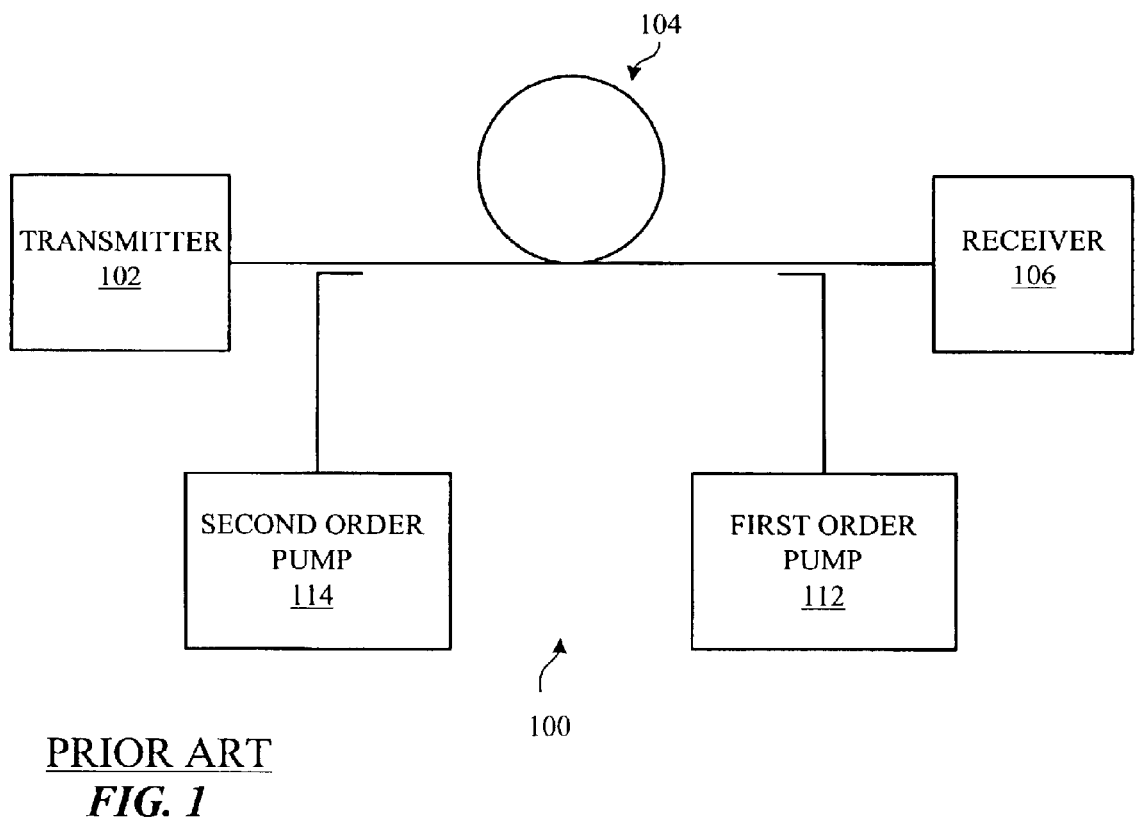
FIG. 1 illustrates an optical communication system in the prior art.
Figure 2:
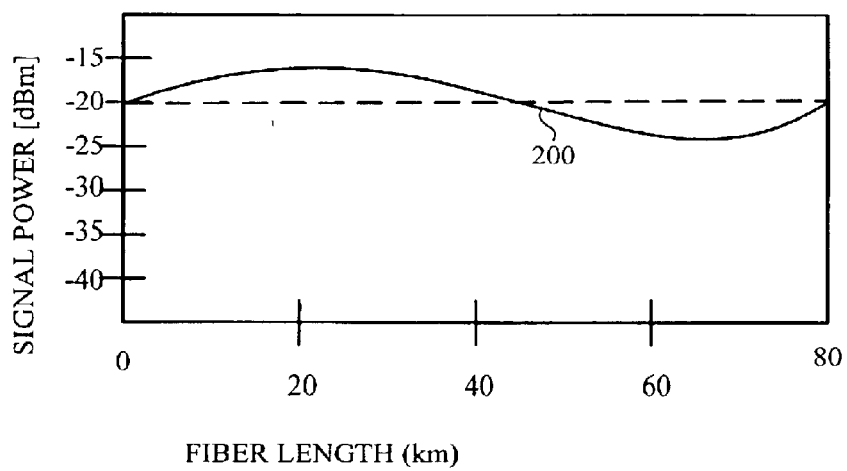
FIG. 2 illustrates the gain of an optical signal traveling on a fiber span in FIG. 1 in the prior art.

FIGS. 1–2 illustrate a prior art optical communication system to help better understand the invention. FIGS. 3–9 and the following description depict specific examples of a discrete optical amplifier system to teach those skilled in the art how to make and use the best mode of the invention. For the purpose of teaching inventive principles, some conventional aspects of the discrete optical amplifier system have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Prior Art Optical Communication System—FIGS. 1–2

FIG. 1 illustrates an optical communication system 100 in the prior art. The configuration illustrated in FIG. 1 was described in the Rottwitt paper cited in the Background.

Optical communication system 100 is comprised of a transmitter 102, a fiber span 104, a receiver 106, a first order pump 112, and a second order pump 114.

First order pump 112 is a 1455 nm Raman pump set to a power of 200 mW. Second order pump 114 is a 1366 nm Raman pump set to a power of 800 mW. Fiber span 104 is a Lucent TrueWave Reduced Slope fiber having a length of 80 km.

In operation, transmitter 102 transmits an optical signal to receiver 106 over fiber span 104. First order pump 112 backward pumps a laser beam onto fiber span 104. Second order pump 114 forward pumps a laser beam onto fiber span 104. The laser beams from first order pump 112 and second order pump 114 generate a gain in the optical signal traveling on fiber span 104 based on the Raman effect. Fiber span 104, which is a regular transmission fiber, is the gain medium for the Raman amplification as first order pump 112 and second order pump 114 pump the laser beams onto fiber span 104. Thus, FIG. 1 illustrates distributed amplification instead of discrete amplification.

FIG. 2 illustrates the gain of the optical signal traveling on fiber span 104 in the prior art. Line 200 illustrates the optical signal as it travels over the 80 km length of fiber span 104. Based on the power settings of first order pump 112 (200 mW) and second order pump 114 (800 mW), the optical signal is amplified at both ends of fiber span 104. Generating gain at the transmitter end in addition to the receiver end results in an improved noise figure in the optical signal.

One problem with the configuration described in the Rottwitt paper is that the power of first order pump 112 and the power of second order pump 114 are set to improve the noise figure only. The Rottwitt paper does not address setting the power of first order pump 112 and second order pump 114 based on fiber non-linearity. Another problem with the configuration described in the Rottwitt paper is that it only illustrates distributed amplification. Discrete amplification may be preferred in some situations.

Figure 3:
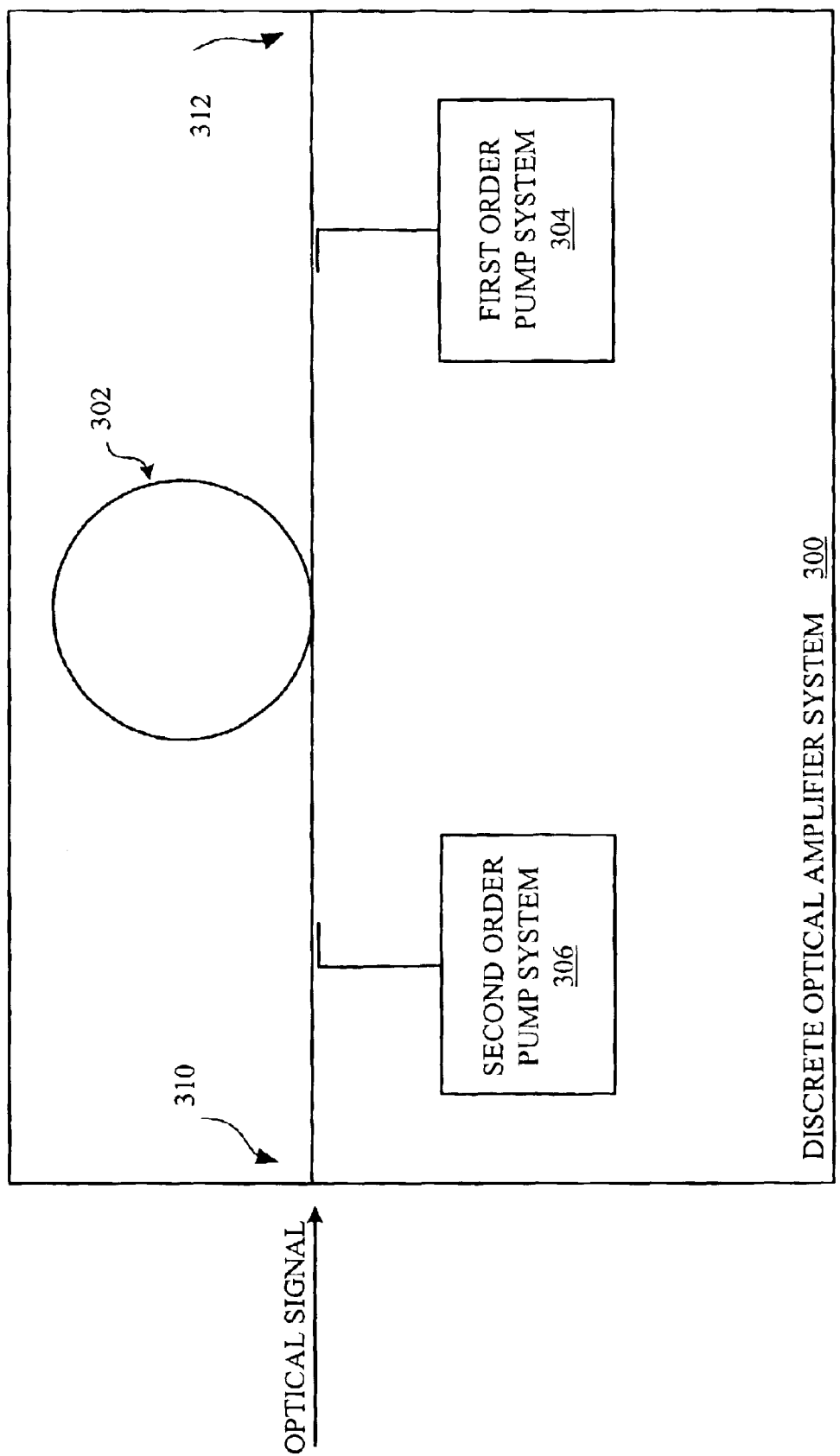
FIG. 3 illustrates a discrete optical amplifier system in an example of the invention.

Discrete Optical Amplifier System—FIG. 3

FIG. 3 illustrates a discrete optical amplifier system 300 in an example of the invention. Discrete optical amplifier system 300 is comprised of a Dispersion Compensating Fiber (DCF) 302, a first order pump system 304, and a second order pump system 306. DCF 304 comprises a ingress end 310 and an egress end 312.

The following definitions may help to clarify the invention. A dispersion compensating fiber comprises a section of fiber that is configured to compensate for dispersion occurring over a length of transmission fiber. Backward pump refers to transmitting a light beam onto an optical fiber in a direction opposite to an optical signal traveling on the optical fiber. Forward pump refers to transmitting a light beam onto an optical fiber in the same direction as an optical signal traveling on the optical fiber. The light beam may comprise a laser beam. A low noise figure comprises a noise figure below 5.5 dB. A power ratio comprises any ratio having as variables a power of a first order pump system and a power of a second order pump system. For instance, the power ratio may comprise a ratio of the power of the first order pump system divided by a summation of the power of the first order pump system and the power of the second order pump system. The power ratio may comprise a ratio in the range of 25% to 33%. A noise figure comprises any measurement of noise for an optical signal. Fiber non-linearities comprise any properties of an optical fiber that disperse, attenuate, or otherwise affect an optical signal traveling over the optical fiber. An ingress end of DCF 302 comprises the end of DCF 302 where an optical signal to be amplified enters DCF 302. An egress end of DCF 302 comprises the end of DCF 302 where the amplified optical signal exits DCF 302.

In operation, first order pump system 304 is set to a first power. Based on the first power, first order pump system 304 backward pumps onto DCF 302. First order pump system 304 may backward pump from egress end 312 of DCF 302. Second order pump system 306 is set to a second power. Based on the second power, second order pump system 306 forward pumps onto DCF 302. Second order pump system 306 may forward pump from ingress end 310 of DCF 302.

One or both of the first power and the second power are set based on a power ratio. The power ratio includes as variables the first power and the second power. One example of the power ratio comprises a ratio of the first power divided by a summation of the first power and the second power.

Concurrently, DCF 302 receives an optical signal from ingress end 310. The optical signal may be received from a regular transmission fiber (not shown). As the optical signal travels over DCF 302, first order pump system 304 and second order pump system 306 generate a gain in the optical signal. The net gain may be above 13 dB. The amplified optical signal then exits DCF 302 out of egress end 312.

For discrete optical amplifier system 300 to perform as desired, the power ratio, the first power of the first order pump system 304, and the second power of the second order pump system 306 are set as follows. The power ratio, the first power, and the second power are set to generate a low noise figure for the gain in the optical signal. A low noise figure for this example comprises a noise figure below 5.5 dB. The power ratio, the first power, and the second power are also set to distribute the gain along DCF 302 to reduce fiber non-linearities affecting the optical signal while traveling over DCF 302. Based on this disclosure, those skilled in the art will appreciate how to modify existing discrete optical amplifier systems to make discrete optical amplifier system 300.

In one example, first order pump system 304 backward pumps a light beam having a first order pump wavelength onto DCF 302. Energy from the light beam having a first order pump wavelength moves to the wavelength of the optical signal. Second order pump system 306 forward pumps a light beam having a second order pump wavelength onto DCF 302. Energy from the light beam having a second order pump wavelength moves to the first order pump wavelength. The energy from the light beams provides enough power to generate the desired gain. The energy from the light beam having a second order pump wavelength provides increased energy to the light beam having the first order pump wavelength to prolong the gain distance along DCF 302 from egress end 312.

In another example, DCF 302 receives wavelength-multiplexed optical signals from ingress end 310. To generate a gain in the wavelength-multiplexed optical signals, first order pump system 304 transmits wavelength-multiplexed light beams, having first order pump wavelengths, onto DCF 302. Second order pump system 304 transmits wavelength-multiplexed light beams, having second order pump wavelengths, onto DCF 302. The wavelength-multiplexed first order pumps and the wavelength-multiplexed second order pumps generate a gain in the wavelength-multiplexed optical signals.

Figure 4:
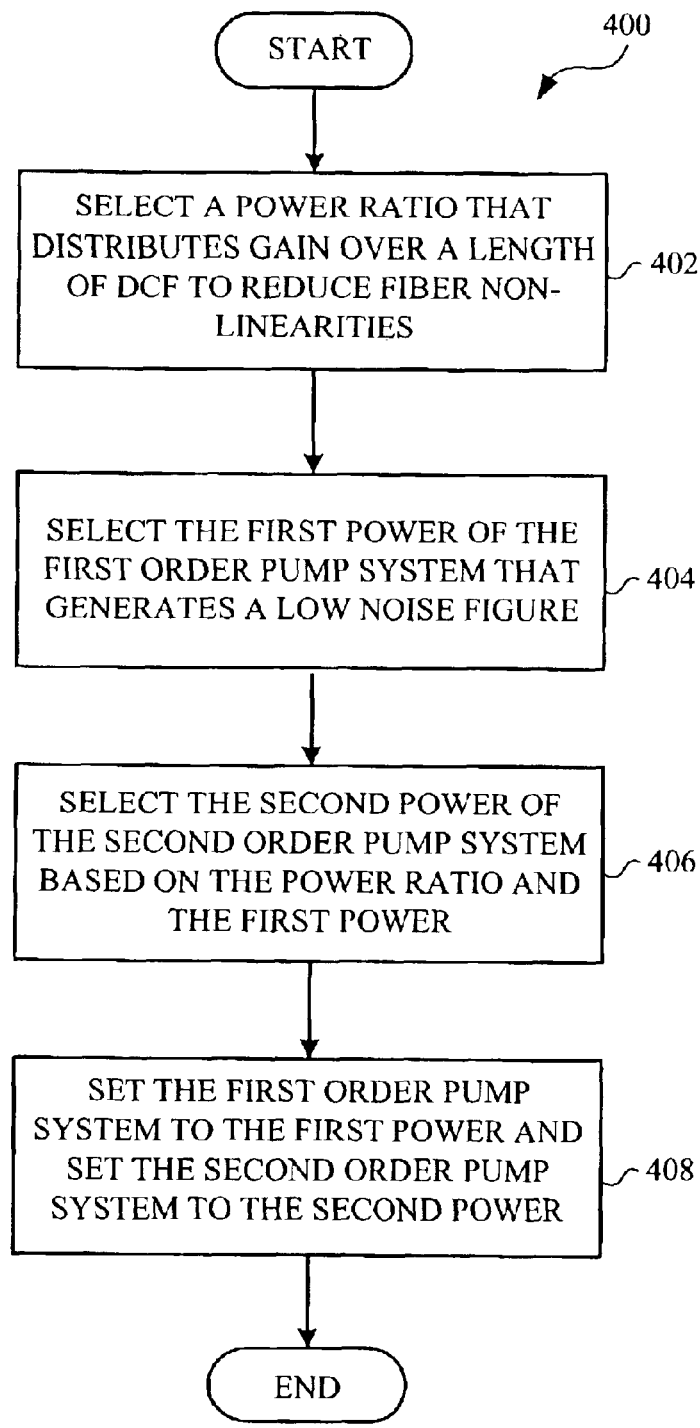
FIG. 4 is a flow chart illustrating a method of calibrating a discrete optical amplifier system in an example of the invention.

Method of Calibrating a Discrete Optical Amplifier System—FIG. 4

FIG. 4 is a flow chart illustrating a method 400 of calibrating a discrete optical amplifier system in an example of the invention. The discrete optical amplifier system may be discrete optical amplifier system 300 in FIG. 3. For this example, the discrete optical amplifier system comprises a dispersion compensating fiber (DCF), a first order pump system coupled to the DCF, and a second order pump system coupled to the DCF. The first order pump system is configured to backward pump onto the DCF. The second order pump system is configured to forward pump onto the DCF. The first order pump system and the second order pump system are configured to generate a gain in an optical signal traveling over the DCF.

To perform method 400, a power ratio is selected that distributes the gain over a length of the DCF to reduce fiber non-linearities affecting the optical signal in step 402. The first power of the first order pump system is selected to generate a low noise figure for the gain in the optical signal in step 404. The second power of the second order pump system is selected based on the power ratio and the first power of the first order pump system in step 406. The first order pump system may be set to the first power and the second order pump system may be set to the second power in step 408.

Using method 400, one can adjust a discrete optical amplifier system to produce a better noise figure, a lower total pump power, and less fiber non-linearity.

Experimental Setup for A Discrete Optical Amplifier System—FIGS. 5–9

Figure 5:
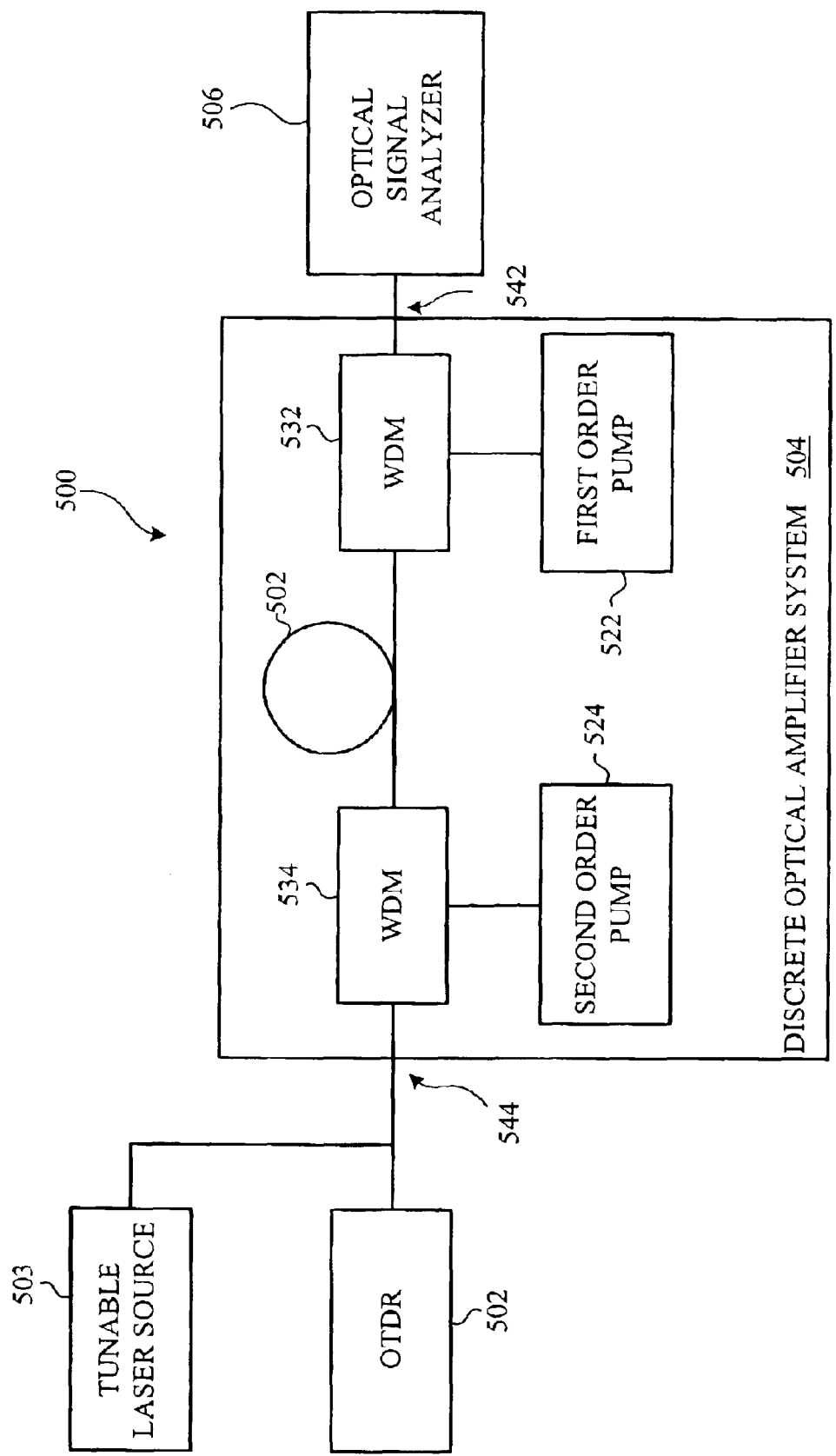
FIG. 5 illustrates an experimental setup for a discrete optical amplifier system in an example of the invention.

FIG. 5 illustrates an experimental setup 500 for a discrete optical amplifier system in an example of the invention. Experimental setup 500 is comprised of an Optical Time Domain Reflectometer (OTDR) 502, a tunable laser source 503, a discrete optical amplifier system 504, and an optical signal analyzer 506. Discrete optical amplifier system 504 is comprised of a dispersion compensating fiber (DCF) 520, a first order pump 522, a second order pump 524, and Wavelength Division Multiplexing (WDM) multiplexers 532, 534.

Discrete optical amplifier system 504 is coupled to OTDR 502, tunable laser source 503, and optical signal analyzer 506. Within discrete optical amplifier system 504, pump 522 is coupled to WDM mux 532 and WDM mux 532 is coupled to DCF 520 near an egress end 542 of DCF 520. Pump 524 is coupled to WDM mux 534 and WDM mux 534 is coupled to DCF 520 near an ingress end 544 of DCF 520.

DCF 520 is configured to compensate for dispersion of an optical signal traveling over a length of transmission fiber. DCF 520 has a length of about 13.4 km. DCF 520 has a total dispersion of 1083 ps/nm, which should compensate for dispersion on a 70 km single mode fiber. DCF 520 has a total dispersion slope of $-3.196$ ps/nm$^2$. Pump 522 comprises a 1455 nm Raman fiber laser. Pump 524 comprises a 1365 nm Raman fiber laser.

One advantage of experimental setup 500 is that it allows for control of the signal power distribution along DCF 520. Different pump powers for pumps 522, 524 generate the same net gain while the signal power distribution in DCF 520 changes. The following describes a method of adjusting discrete optical amplifier system 504 considering both a noise figure and fiber non-linearity.

Figures 6, 7:
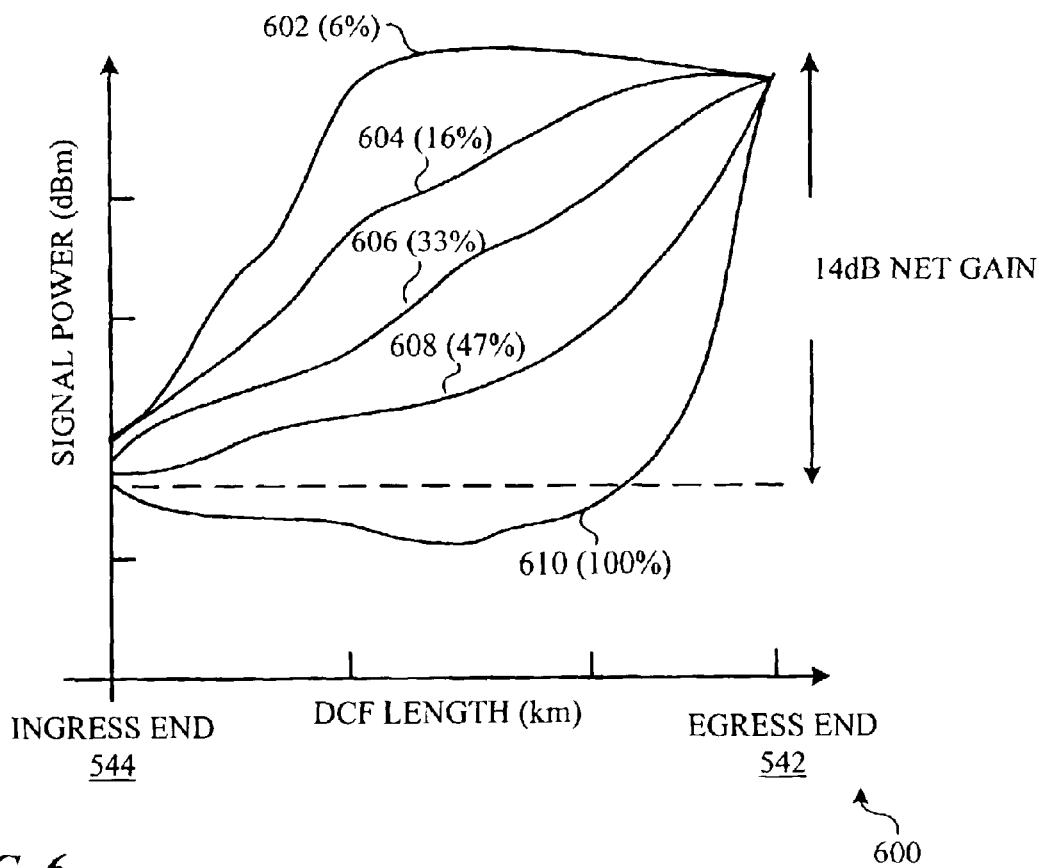
FIG. 6 is a graph illustrating the signal power distribution over a length of dispersion compensating fiber in an example of the invention.
FIG. 7 illustrates a table of different pump power combinations in an example of the invention.

FIG. 6 is a graph 600 illustrating the signal power distribution over the length of DCF 520 in an example of the invention. For this example, the target net gain is set to 14 dB. OTDR 502 measures the signal power distribution for different power ratios. The power ratio comprises a ratio between the power of the first order pump (pump 522) divided by total pump power (power of pump 522 plus power of pump 524). Line 602 illustrates a power ratio of about 6%. Line 604 illustrates a power ratio of about 16%. Line 606 illustrates a power ratio of about 33%. Line 608 illustrates a power ratio of about 47%. Line 610 illustrates a power ratio of about 100% (a backward first order pump only).

FIG. 6 shows that as the power ratio decreases, the signal power distribution shifts towards ingress end 544 of DCF 520. Line 602 shows that the lower the power ratio, the earlier the signal power increases. This can be beneficial for lowering the noise figure because the noise travels over a longer distance of DCF 520. DCF 520 helps to attenuate the noise. However, the average signal power for line 602 is high over the length of DCF 520. Fiber non-linearity is exponentially related to signal power. Thus, the high average signal power for line 602 causes high fiber non-linearity.

Line 610 shows that the higher the power ratio, the later the optical signal power increases along the length of DCF 520. This is not as beneficial for lowering the noise figure because the gain is generated close to egress end 542 of DCF 520. From a fiber non-linearity standpoint, the average optical signal power for line 610 is lower than line 602, meaning that the fiber non-linearity is lower for line 610 than line 602.

Thus, an acceptable power ratio is somewhere between line 602 and 610. After looking at the power ratios, pumps 522 and 524 are set to different power combinations. FIG. 7 illustrates a table 700 of different pump power combinations for pumps 522 and 524 in an example of the invention. The different pump powers generate a gain in an optical signal traveling over DCF 520 in different manners. The pump powers are selected to achieve a 14 dB net gain.

Figure 8:
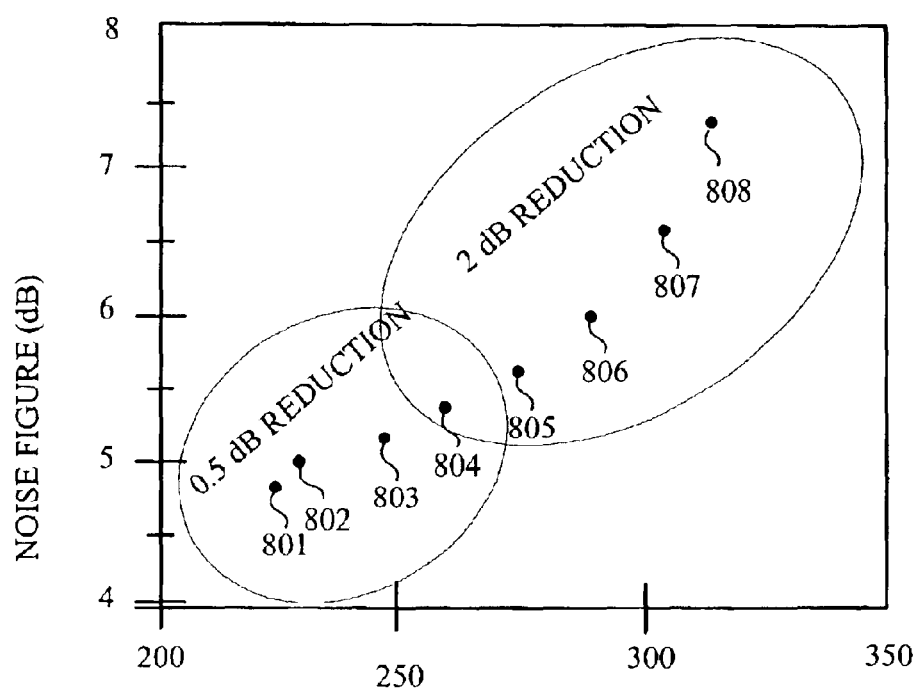
FIG. 8 is a graph illustrating a relationship between the power of a first order pump and a corresponding noise figure in an example of the invention.

FIG. 8 is a graph 800 illustrating a relationship between the power of pump 522 and a corresponding noise figure in an example of the invention. The eight pump 522 powers, plotted in graph 800 as marks 801–808, correspond to the eight pump 522 powers listed in table 700 in FIG. 7. For instance, when pump 522 is set to a power of 225.4 mW, the corresponding noise figure is approximately 4.8 dB (mark 801). When pump 522 is set to a power of 259.0 mW, the corresponding noise figure is approximately 5.3 dB (mark 804). When pump 522 is set to a power of 315.2 mW, the corresponding noise figure is approximately 7.4 dB (mark 808).

Graph 800 shows that a lower pump power for pump 522 corresponds to a lower noise figure. The lower noise figure is advantageous for amplifying an optical signal. However, a low pump power for pump 522 that achieves the best noise figure may mean high fiber non-linearity. Any increase in pump 524 may result in higher fiber non-linearities with only a small reduction in the noise figure.

Thus, pump 522 is set to optimize both the noise figure and the fiber non-linearity. Looking at graph 800, the marks 804–808 represent 2 dB reductions in the noise figure. Marks 801–804 represent 0.5 dB reductions in the noise figure. The noise figures reduce steeply by decreasing the power of pump 522. The noise figures start to flatten at the lower power of pump 522, such as at mark 804 when pump 522 is set to a power of about 259.0 mW. The intersection of the steep change and the flat change may be the point where there is a low noise figure, a lower total pump power, and less fiber non-linearity. Therefore, for this example, pump 522 is set to 259.0 mW. Based on the power ratio determined from FIG. 7, pump 524 is set to 635.8 mW (a ratio of about 29%). The noise figure for this pump setting is about 5.28 dB, which is about a 2 dB improvement over a discrete optical amplifier having only a first order pump.

Figure 9:
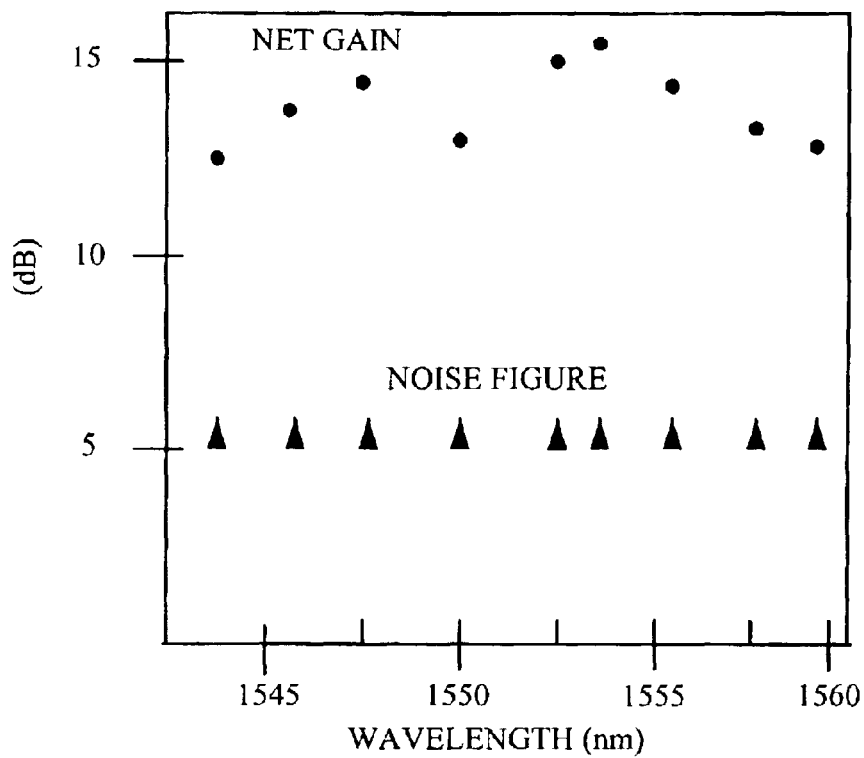
FIG. 9 is a graph illustrating a relationship between net gain and wavelength and a noise figure and wavelength in an example of the invention.

FIG. 9 is a graph illustrating a relationship between net gain and wavelength and a noise figure and wavelength for the optical signal in an example of the invention. By setting the power ratio between pump 522 and pump 524 as described in this example, a 2 dB noise figure improvement can advantageously be achieved.

What is claimed is:

1. A discrete optical amplifier system, comprising:
   a dispersion compensating fiber configured to transport an optical signal;
   a first order pump system set to a first power and configured to backward pump onto the dispersion compensating fiber; and
   a second order pump system set to a second power and configured to forward pump onto the dispersion compensating fiber, wherein at least one of the first power and the second power are set based on a power ratio, wherein the power ratio includes as variables the first power and the second power;
   wherein the first order pump system and the second order pump system generate a gain in the optical signal;
   wherein the power ratio, the first power, and the second power are set to:
   generate a low noise figure for the gain in the optical signal, and
   distribute the gain along the dispersion compensating fiber to reduce fiber non linearities affecting the optical signal while traveling over the dispersion compensating fiber.

2. The discrete optical amplifier system of claim 1 wherein the power ratio comprises a ratio of the first power divided by a summation on of the first power and the second power.

3. The discrete optical amplifier system of claim 2 wherein the power ratio is in the range of 25% to 33%.

4. The discrete optical amplifier system of claim 1 wherein the low noise figure is less than approximately 5.5 dB.

5. The discrete optical amplifier system of claim 1 wherein the length of dispersion compensating fiber is less than 15 km.

6. The discrete optical amplifier system of claim 1 wherein the discrete optical amplifier system is configured to couple to a length of transmission fiber of approximately 70 km long and compensate for dispersion on the length of transmission fiber.

7. The discrete optical amplifier system of claim 1 wherein the gain the optical signal is at least 13 dB.

8. The discrete optical amplifier system of claim 1 wherein:
   the first order pump system comprises a 1455 nm Raman pump laser; and
   the second order pump system comprises a 1365 nm Raman pump laser.

9. A method of operating a discrete optical amplifier system, wherein the discrete optical amplifier system comprises a dispersion compensating fiber, a first order pump system, and a second order pump system, wherein the dispersion compensating fiber is configured to transport an optical signal the method comprising:
   backward pumping the first order pump system onto the dispersion compensating fiber, wherein the first order pump system is set to a first power;
   forward pumping the second order pump system onto the dispersion compensating fiber, wherein the second order pump system is set to a second power, wherein at least one of the first power and the second power are set based on a power ratio, wherein the power ratio includes as variables the first power and the second power; and generating a gain in the optical signal based on the first power of the first order pump system and the second power of the second order pump system;

wherein the power ratio, the first power, and the second power are set to:
generate a low noise figure for the gain in the optical signal, and
distribute the gain along the dispersion compensating fiber to reduce fiber non-linearities affecting the optical signal while traveling over the dispersion compensating fiber.

10. The method of claim 9 wherein the power ratio comprises a ratio of the first power divided by a summation of the first power and the second power.

11. The method of claim 10 wherein the power ratio is in the range of 25% to 33%.

12. The method of claim 9 wherein the low noise figure is less than approximately 5.5 dB.

13. The method of claim 9 wherein the length of dispersion compensating fiber is less than 15 km.

14. The method of claim 9 further comprising:
receiving the optical signal from a length of transmission fiber of approximately 70 km; and
compensating for dispersion on the length of transmission fiber.

15. The method of claim 9 wherein the gain in the optical signal is at least 13 dB.

16. The method of claim 9 wherein:
backward pumping the first order pump system onto the dispersion compensating fiber comprises backward pumping a 1455 μm Raman pump laser onto the dispersion compensating fiber; and
forward pumping the second order pump system onto the dispersion compensating fiber comprises forward pumping a 1367 nm Raman pump laser onto the dispersion compensating fiber.

17. A method of calibrating a discrete optical amplifier system, wherein the discrete optical amplifier system comprises a dispersion compensating fiber, a first order pump system coupled to the dispersion compensating fiber, and a second order pump system coupled to the dispersion compensating fiber, wherein the first order pump system is configured to backward pump onto the dispersion compensating fiber and the second order pump system is configured to forward pump onto the dispersion compensating fiber, wherein the first order pump system and the second order pump system are configured to generate a gain in an optical signal traveling over the dispersion compensating fiber, the method comprising:

selecting a power ratio having as variables a first power of the first order pump system and a second power of the second order pump, wherein the power ratio is selected to distribute the gain over a length of the dispersion compensating fiber to reduce fiber non-linearity affecting the optical signal while traveling over the dispersion compensating fiber;

selecting the first power of the first order pump system that generates a low noise figure for the gain in the optical signal; and selecting the second power of the second order pump system based on the power ratio and the first power of the first order pump system.

18. The method of claim 17 further comprising:
setting the first order pump system to the first power; and
setting the second order pump system to the second power.

19. The method of claim 17 wherein the power ratio comprises a ratio of the first power divided by a summation of the first power and the second power.

20. The method of claim 19 wherein the power ratio is in the range of 25% to 33%.

21. The method of claim 17 wherein the low noise figure is less than approximately 5.5 dB.

* * * * *